Dec. 26, 1922.

R. G. BEECHLER.
SPRING PERCH.
FILED DEC. 27, 1920.

1,439,787

Inventor
Roy G. Beechler,

By
Attorneys

Patented Dec. 26, 1922.

1,439,787

UNITED STATES PATENT OFFICE.

ROY G. BEECHLER, OF DETROIT, MICHIGAN, ASSIGNOR TO VULCAN MOTOR AXLE CORPORATION, OF DETROIT, MICHIGAN, A CORPORATION OF VIRGINIA.

SPRING PERCH.

Application filed December 27, 1920. Serial No. 433,531.

*To all whom it may concern:*

Be it known that I, ROY G. BEECHLER, a citizen of the United States of America, residing at Detroit, in the county of Wayne and State of Michigan, have invented certain new and useful Improvements in Spring Perches, of which the following is a specification, reference being had therein to the accompanying drawings.

This invention aims to provide a spring perch that may be integral with a rear axle housing or detachable relative to such a housing or rear axle casing, and in either instance provision is made for preventing lateral and vertical displacement of springs placed on the perches. In the application of my invention to a rear axle housing provision is made for connecting radius rods, brackets and other devices to the rear axle housing adjacent the spring perch thereof, and in making such provision the rear axle housing has been strengthened and reinforced at the spring perch.

The advantages gained by my invention will be apparent as the construction is described in connection with the drawing, wherein Figure 1 is a plan of a portion of the rear axle housing provided with a spring perch in accordance with my invention;

First considering Figs. 1 to 4 inclusive, the rear axle housing is designated 1 and has its walls tapering inwardly to a cylindrical portion 2 which terminates in a flared end portion 3 adapted for supporting bearings, brake mechanism and elements that may enter into a wheel assembly at the end of the rear axle housing.

Figure 1:
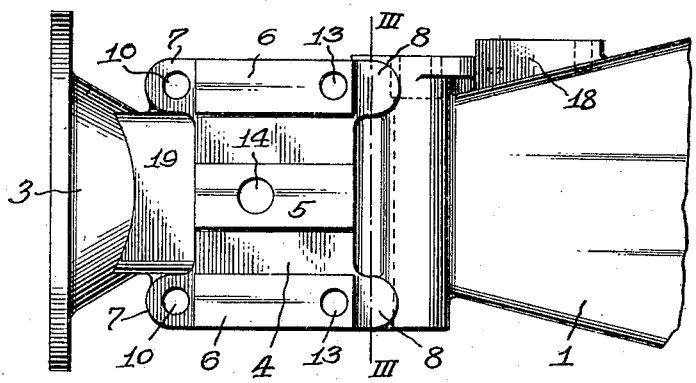

The top of the cylindrical portion 2 of the rear axle housing is enlarged and made comparatively flat so as to provide a perch member 4 having a central or intermediate pad 5 and end pads 6, the pads 5 and 6 being in spaced relation and disposed in longitudinal parallel planes, as best brought out in Fig. 1. The ends of the pads 6 terminate in lugs 7 and 8 which vertically aline with laterally projecting flanges 9 carried by the bottom wall of the cylindrical portion 2 of the rear axle housing 1. The lugs 7 are apertured as at 10, with said apertures vertically alining with apertures 11 in one of the flanges 9, and the other flange is also apertured as at 12, with the apertures thereof vertically alining with apertures 13 in the pads 6, adjacent the lugs 8.

The pad 5 is also apertured, as at 14, and the complete perch member is reinforced and strengthened relative to the walls of the cylindrical portion 2, by webs 15ª within the cylindrical portion 2, these webs preventing walls of the axle housing from being crushed due to any excessive stresses or strains produced by a spring anchored on the perch member.

The aperture 14 of the central pad 5 permits of a stud, bolt or other member carried by a spring correctly positioning the spring on the perch member and the spring is adapted to be held in the usual manner by U-bolts, clevices or other devices extending through the apertures 10, 11, 12 and 13, so that a spring will be positively anchored on the perch member.

Figure 2:
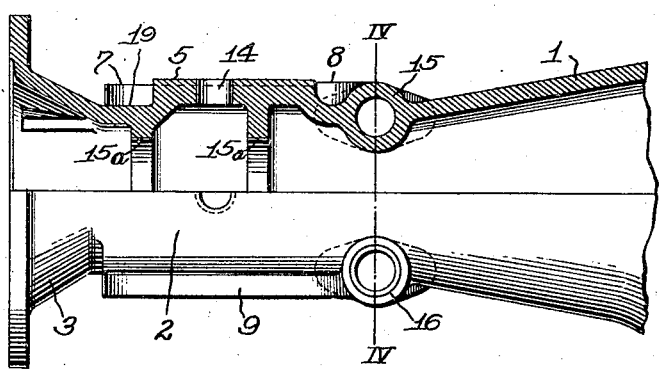
Fig. 2 is a side elevation of the same, partly broken away and partly in longitudinal section.
Figure 3:
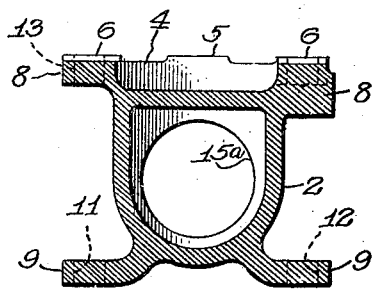
Fig. 3 is a cross sectional view taken on the line III—III of Fig. 1.
Figure 4:
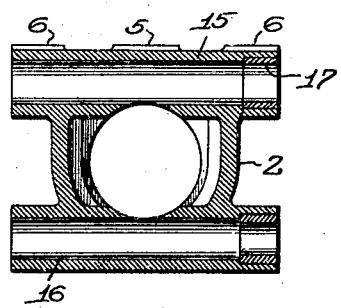
Fig. 4 is a similar view taken on the line IV—IV of Fig. 2.

Contiguous to the perch member 4 and the lateral flanges 9 are tubular bosses or enlargements 15 and 16, said enlargements being disposed transversely of the upper and lower walls of the axle housing 1 at the juncture of the housing with the cylindrical portion 2 thereof, and by reference to Fig. 2 it will be noted that the lugs 8 and the flanges 9 are integral with the tubular bosses. Furthermore, by reference to Fig. 4, it will be noted that the tubular bosses are formed to provide clearance for an axle tube or axle which may extend through the housing 1, and said tubular bosses are provided so that radius rods may be suitably connected to the rear axle housing. In order that such radius rods may be properly centered relative to the tubular bosses and thus avoid excessive machine operation in connection with the bosses, said bosses have sleeves or bushings 17 set in the forward ends thereof, said bushings being finished for an accurate fitting of radius rods irrespective of the finish of the remaining portions of the tubular bosses.

A pad 18 is formed integral with the front wall of the rear axle housing 1 to accommodate any brackets or other fixtures and said pad joins the tubular bosses 15 and 16 so that this portion of the rear axle housing is materially reinforced. With this same strengthening idea in mind the flared end 3 of the axle housing is connected to the spring perch member 4 by a web portion 19 and it is now apparent that the extreme end of the rear axle housing is sufficiently strengthened to withstand the pressure of a spring and its load resting on the spring perch member.

What I claim is:—

1. The combination of an axle housing, a perch member integral with said housing and provided with pads, internal webs reinforcing the walls of said housing at said perch member and lateral flanges carried by said axle housing adapted to cooperate with said pads and a suitable fastening means for retaining a spring on said pads.

2. The combination of an axle housing, a perch member integral therewith adapted for supporting a spring, and tubular bosses transversely of said axle housing and integral with the upper and lower walls thereof.

3. The combination set forth in claim 2, wherein the axle housing has lateral flanges adapted to cooperate with the spring perch thereof in receiving fastening means for a spring mounted on the spring perch.

4. The combination of an axle housing, a spring perch integral with the upper wall thereof, lateral flanges integral with the lower wall of the housing, and tubular bosses disposed transversely of the axle housing and adjoining the spring perch and flanges thereof.

In testimony whereof I affix my signature in presence of two witnesses.

ROY G. BEECHLER.

Witnesses:
ANNA M. DORR,
KARL H. BUTLER.